United States Patent
Kleitsch

(10) Patent No.: US 9,422,996 B2
(45) Date of Patent: Aug. 23, 2016

(54) WHEEL HOUSING WITH ACCUMULATOR

(71) Applicant: Caterpillar Inc., Peoria, IL (US)

(72) Inventor: Andrew J Kleitsch, Shorewood, IL (US)

(73) Assignee: Caterpillar Inc., Peoria, IL (US)

( * ) Notice: Subject to any disclaimer, the term of this patent is extended or adjusted under 35 U.S.C. 154(b) by 123 days.

(21) Appl. No.: 14/457,024

(22) Filed: Aug. 11, 2014

(65) Prior Publication Data

US 2016/0040736 A1    Feb. 11, 2016

(51) Int. Cl.
*F16D 55/40*    (2006.01)
*F16D 65/853*   (2006.01)
*F16D 55/24*    (2006.01)
*F16D 65/18*    (2006.01)
*F16D 65/78*    (2006.01)

(52) U.S. Cl.
CPC .............. *F16D 65/853* (2013.01); *F16D 55/24* (2013.01); *F16D 55/40* (2013.01); *F16D 65/186* (2013.01); *F16D 2065/783* (2013.01)

(58) Field of Classification Search
CPC ............ F16D 65/853; F16D 2065/782; F16D 2065/783; F16D 55/24; F16D 55/36; F16D 55/40; F16D 2125/14
See application file for complete search history.

(56) References Cited

U.S. PATENT DOCUMENTS

| 3,180,444 A  | * | 4/1965  | Hause ................. B60K 17/043 180/339 |
| 4,844,217 A  |   | 7/1989  | Betlinski et al. |
| 5,197,574 A  |   | 3/1993  | Al-Deen et al. |
| 7,611,429 B2 | * | 11/2009 | O'Neill ................. A63B 41/12 473/594 |
| 8,534,061 B2 |   | 9/2013  | Fudouji |
| 2010/0031901 A1 | * | 2/2010 | Dahl ..................... F01P 11/028 123/41.05 |
| 2013/0186714 A1 |  | 7/2013 | Hoots et al. |
| 2013/0200687 A1 |  | 8/2013 | Guo et al. |

FOREIGN PATENT DOCUMENTS

| DE | 19910100 A1 | 9/2000 |
| DE | 10317854 A1 | 11/2004 |
| DE | 10318613 B3 | 1/2005 |
| JP | 4171150 B2  | 10/2008 |

* cited by examiner

*Primary Examiner* — Anna Momper
(74) *Attorney, Agent, or Firm* — Miller, Matthias & Hull LLP

(57) ABSTRACT

A wheel housing for a vehicle, such as a truck. The wheel housing includes a rotatable hub and stationary axle housing disposed within the hub. A wet brake assembly is disposed between the axle housing and the hub. The wet brake assembly includes a disc stack, which includes a plurality of friction plates that are coupled for rotation with the hub and that are separated from each other by a plurality of separator plates that remain stationary with the axle housing. The disc stack is cooled by coolant or oil that flows through a closed circuit. During a braking event, pressure spikes in the coolant circuit are alleviated by the placement of a compressible accumulator in the outlet passageway of the coolant circuit.

18 Claims, 2 Drawing Sheets

WHEEL HOUSING WITH ACCUMULATOR

BACKGROUND

1. Technical Field

This document discloses a wheel housing with an accumulator, and in particular, a wheel housing that uses coolant or oil to cool a brake assembly and an accumulator disposed in the wheel housing to alleviate pressure concerns of the coolant.

2. Description of the Related Art

Mobile machines are equipped with one or more brake systems to slow the machines in response to an operator input. Typical brake systems can include one or more dry brakes and/or one or more wet brakes associated with different axles and/or wheels of the machine. Wet brakes are similar in construction to dry brakes but include a coolant circuit that flows through the wet brake assembly to cool the assembly after generating substantial amounts of heat during use. While dry brakes are simple, inexpensive, and easy to service in comparison to wet brakes, dry brakes also wear faster and have lower braking capacities than wet brakes due to the extreme temperatures generated when dry brakes are applied.

Both wet and dry brakes generally include a stationary reaction plate, a slidable member in the form of a pressure plate or a service piston, and one or more friction plates sandwiched between the reaction plate and slidable member. The friction plates connect to and rotate with the associated axle or wheel. Non-rotating spacer or separator plates interleaved between the friction plates create a row of alternating friction and separator plates known as a disc stack. Both types of brakes also include a biasing mechanism, such as a spring or source of pressurized fluid, which urges the slidable member towards the reaction plate, thereby squeezing the disc stack therebetween. In this arrangement, the biasing element, via the slidable member, separator and reaction plates, generates and applies a pressure on or squeezes the rotating friction plates. The frictional contact between the slidable member and the friction, separator and reaction plates generates substantial amounts of heat, which is reduced by the coolant circuit of a wet brake.

Specifically, the disc stack of a wet brake is submerged in circulating coolant or oil that cools the disc stack during operation. Wet brakes cooled via circulating oil are also known as force-cooled wet brakes. The oil used to cool the plates of a wet brake is contained within a closed circuit. To keep the oil used to cool the disc stack from leaking out of the circuit, seals are used between the stationary axle housing and the rotating hub and/or between stationary components of the wet brake assembly and the rotating hub. These seals may be mechanical face seals, also known as duo cone seals.

Regardless of the type of seal used, premature failure of the seals can occur because of pressure spikes resulting from the volume of oil expelled from the disc stack as the friction and separator plates are squeezed together during braking events. These pressure spikes may exceed the working limit of the seals, which may lead to premature failure of the seals. US2013/200687 discloses a hydraulic braking system that includes a damper inside a separate hydraulic housing upstream of the wheels for relieving pressure spikes in the hydraulic braking system. The separate housing contains a bladder filled with magneto-rheological fluid and a magnetic coil wraps around the housing for controlling the action of the bladder. US2013/200687 does not address the issue of pressure spikes in the oil circuit used to cool the disc stack of a wet brake.

Accordingly, a means is needed for a reducing pressure spikes in the coolant or oil circuits of wet brake assemblies.

SUMMARY OF THE DISCLOSURE

In one aspect, the wheel housing of a vehicle is disclosed. The disclosed wheel housing may include a rotatable hub and a stationary axle housing disposed within the hub. The wheel housing may further include a brake assembly disposed between the axle housing and the hub. The brake assembly may include an inlet in fluid communication with an outlet passageway. Coolant can be moved or flow between the inlet and the outlet passageway. The wheel housing may further include an accumulator disposed in the outlet passageway to absorb pressure spikes of the coolant within the outlet passageway.

In another aspect, a method for assembling a brake housing is disclosed. The method may include inserting a stationary axle housing within a rotatable hub, disposing a brake assembly between the axle housing and the hub, and providing a coolant circuit in communication with the brake assembly, wherein the coolant circuit includes an outlet passageway disposed between the axle housing and the brake assembly. The method may further include providing an accumulator in the outlet passageway, wherein the accumulator is configured to retract in volume when a pressure of the coolant increases as a result of a braking event.

In another aspect, a machine is disclosed. The machine may include a plurality of wheel housings. Each wheel housing may include a rotatable hub and a stationary axle housing disposed within the hub. The truck may further include a brake assembly that may be disposed between the axle housing and the hub. The brake assembly may include a brake housing that may be coupled to the axle housing. The brake assembly may further include a disc stack. The disc stack may include a plurality of friction plates coupled to the hub by a spline. The brake housing may accommodate a service piston and the brake housing may be coupled to a reaction plate. The disc stack may be sandwiched between the service piston and the reaction plate. The brake housing may include an inlet for receiving coolant. The inlet may be in fluid communication with the disc stack. The disc stack may be in fluid communication with an outlet passageway disposed between the brake assembly and the axle housing. The outlet passageway may be in fluid communication with the inlet. The truck may further include a first duo cone seal disposed between the spline and the axle housing and a second duo cone seal disposed between the reaction plate and at least one of the reaction plate and the hub. The inlet, disc stack, first duo cone seal, second duo cone seal and the outlet passageway may form a closed circuit for the coolant. Further, the truck may include a compressible accumulator bladder disposed in the outlet passageway.

BRIEF DESCRIPTION OF THE DRAWINGS

For a more complete understanding of the disclosed methods and apparatuses, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
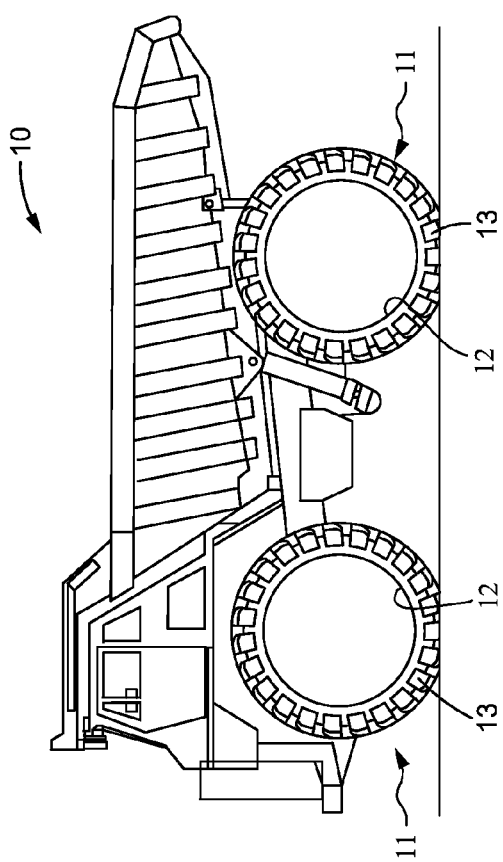
FIG. 1 is a side plan view of a machine that may be equipped with a disclosed wet brake assembly or wheel housing.

FIG. 1 illustrates an exemplary machine 10 having at least one wheel housing 11. The wheel housing 11 may include an output member 12, such as a wheel. The output members 12 drive ground-engaging elements 13, which may be tires, although other types of ground engaging elements 13 may be employed. The output members 12 may be coupled to rotating hubs 14, one of which is shown in FIG. 2.

Figure 2:
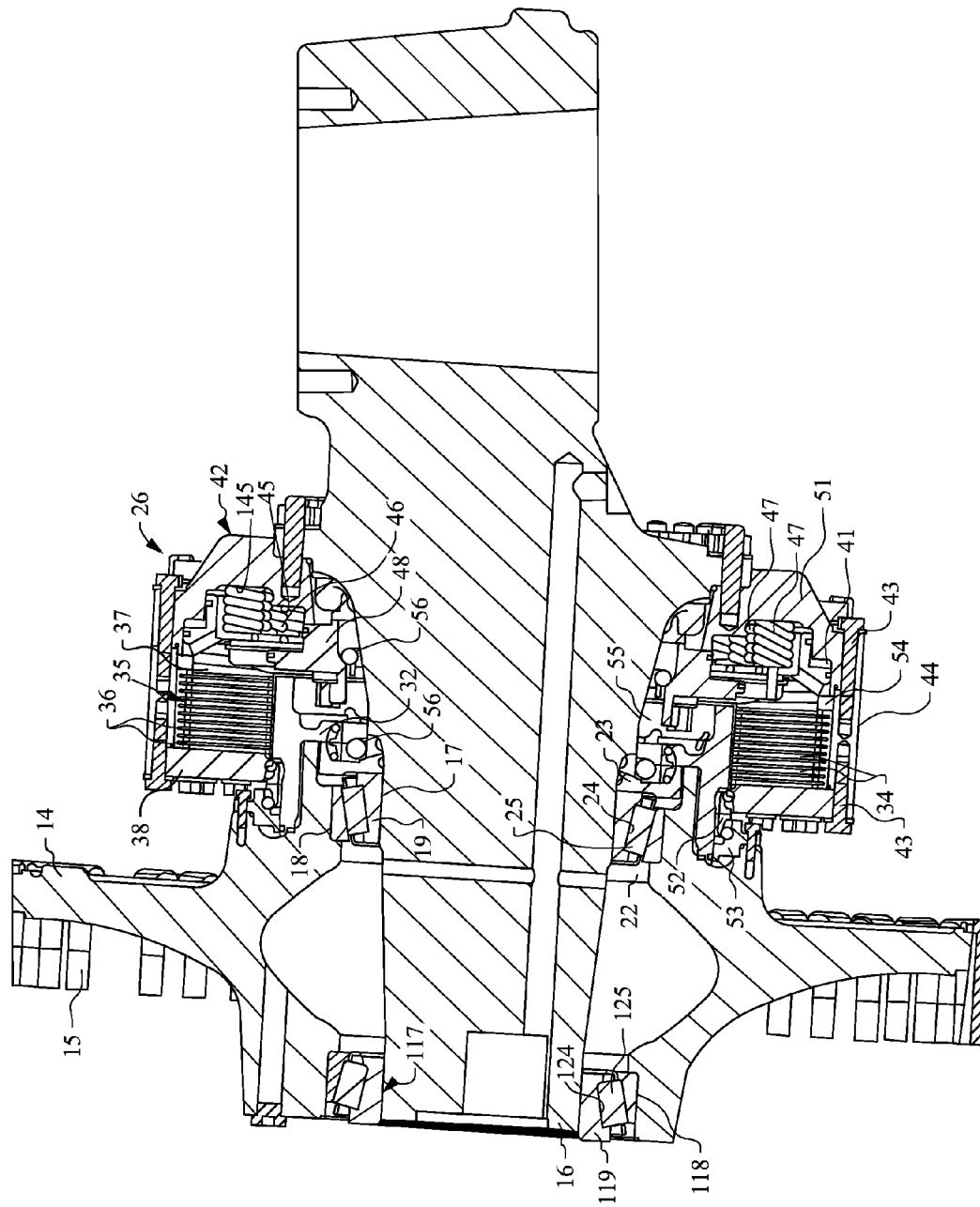
FIG. 2 is a partial sectional view of a wheel housing equipped with a disclosed wet brake assembly and a disclosed wet brake accumulator.

Turning to FIG. 2, the rotating hub 14 may be connected to the output member 12 (not shown in FIG. 2) using bolts or fasteners 15. A stationary axle housing 16 is disposed within the hub 14 that rotates about the axle housing 16 on one or more bearing assemblies 17, 117. The bearing assemblies 17, 117 may include an outer ring 18, 118 and an inner guide ring 19, 119. The inner guide rings 19, 119 may also include a recess 24, 124 that accommodates a plurality of rolling elements 25, 125. The inner guide ring 19 may be sandwiched between a retainer 22 and a seal housing 23. The seal housing 23 may accommodate part of a first mechanical face seal 31. The first mechanical face seal 31 may also be disposed between the spline 32 and the axle housing 16.

The spline 32, while part of the brake assembly 26, rotates with the hub 14 as do the friction plates 34, which form part of a disc stack 35. The disc stack 35 may also include a plurality of separator plates 36 that do not rotate with the hub 14, but remain stationary with the axle housing 16. The disc stack 35 may be sandwiched between a service piston 37 and a reaction plate 38. To apply the brakes, or to create a braking event, pressurized fluid enters the control chamber 41 and drives the service piston 37 to the left thereby compressing the disc stack 35 between the service piston 37 and the reaction plate 38. The reaction plate 38 remains stationary. A second mechanical face seal 52 separates the stationary reaction plate 38 from the rotating spline 32. A seal housing 53 may accommodate part of the second mechanical face seal 52.

The brake assembly 26 may also include a brake housing 42, which may be coupled to the reaction plate 38 by fasteners 43 and a cover 44 as shown in FIG. 2. The brake housing 42 may include one or more recesses 45, 145 that accommodate one or more springs 46, 47 that, when released, drive the parking brake piston 48 towards the service piston 37 and the disc stack 35 when the parking brake is applied by the operator.

To cool the disc stack 35, coolant or oil flows through an inlet 54 formed by the brake housing 42 and the cover 44. The coolant then flows through the disc stack 35 and radially inwardly towards an outlet passageway 55. The outlet passageway 55 may be in fluid communication with the inlet 54 to form a closed circuit for circulating the coolant. The closed circuit may be defined by the inlet 54, the disc stack 35, the first and second mechanical face seals 31, 52 and the outlet passageway 55.

During the course of the braking event, hydraulic brake fluid flows into the control chamber 41 thereby driving the service piston 37 towards the disc stack 35, which compresses the disc stack 35 between the service piston 37 and the reaction plate 38. This action expels any coolant or oil that is disposed between the alternating friction plates 34 and separator plates 36. The coolant that is expelled from the disc stack 35 can cause a pressure spike in the coolant circuit. The coolant circuit may include the inlet 54 that is in fluid communication with the disc stack 35 that, in turn, is in fluid communication with the outlet passageway 55, which, in turn, is in fluid communication with the inlet 54. A pressure spike in the coolant circuit can cause premature failure of the first and second mechanical face seals 31, 52 because such pressure spikes can exceed the ratings of the first and second mechanical face seals 31, 52.

Figure 3:
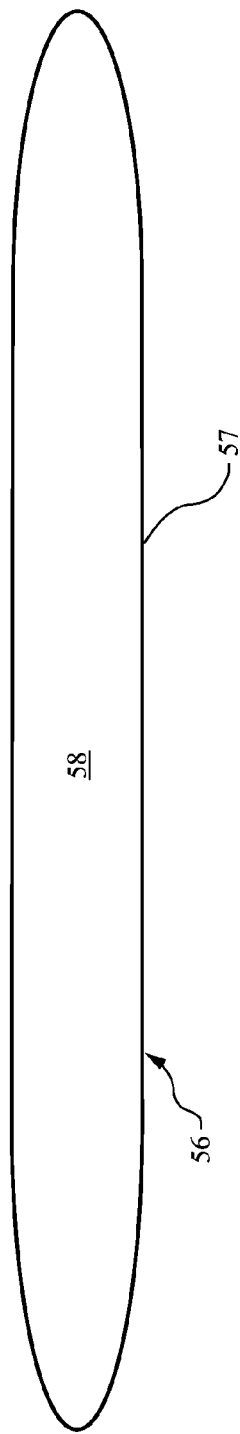
FIG. 3 is a plan view of a disclosed, compressible wet brake accumulator.

To alleviate this problem, one or more accumulators 56 may be coupled to the coolant circuit, and in this particular example, disposed in the outlet passageway 55, which may be defined by the axle housing 16, the brake housing 42 and the park brake housing 51. However, the accumulator(s) 56 may be disposed within any cavity that is fluid communication with the coolant circuit. The outlet passageway 55 is but one cavity that may accommodate one or more accumulators 56. As shown in FIG. 3, the accumulator 56 may be elongated and, as shown in FIG. 2, may be wrapped around the axle housing 16 more than once, such as twice. In one example, the accumulator 56 is coupled to the housing 16. For example, the accumulator can couple to the housing with a structural adhesive or a mechanical fastener such as a clamping device or a bracket device. The accumulator also can coupled to the housing with a non-metallic fastener such as hose sleeve device or bound by a tie attachment surrounding the housing in which the accumulator would fit between the inner surface of the sleeve device and the outer surface of the housing. The accumulator 56 may include an outer polymeric shell 57 with an interior 58 that may be pressurized, such as with air or another compressible material. The polymeric shell 57 may be fabricated from a fluoroelastomer. The fluoroelastomer may be reinforced with a fibrous material, and the fibers may be made from a polymeric material such as a polyamide. One suitable polyamide is nylon. These materials are durable and provide sufficient flexibility so that the accumulator 56 may be movable between an expanded state and a fully or close to fully compressed state.

The interior 58 of the accumulator 56 may be pre-charged with air or another gas to have a pre-charge pressure such that the accumulator has the expanded state. The air or gas can be pressurized to a pressure that is less than the pressure spike pressure of the coolant. In some instances, the pressure can be about the pressure of the coolant at a steady state such that the accumulator can maintain its expanded state when the cooling is at steady state pressure. In other instances, the accumulator can be slightly less than the steady state pressure such that the accumulator in an intermediate compressed state between the expanded state and a fully or close to fully compressed state. For example, the pre-charge pressure can have a pressure range from about 5 to about 10 psig (from about 34.5 to about 69 little kPa). The accumulator may also be filled or partially filled with another compressible material, such as a foam. Thus, when a pressure spike is generated from the compression of the disc stack 35, the increased pressure in the outlet passageway 55 is reduced as the accumulator 56 is compressed to the fully or close to fully compressed state by the increased pressure in the coolant circuit. Then, when the pressure spikes subsides, the accumulator 56 returns to its expanded state. The expansion of the accumulator can aid the return of the coolant to tank.

In other embodiments, the accumulator can be located external to the brake housing (not shown). Here, a hydraulic line can be coupled between the outlet passageway and an inlet of the accumulator. In this example, the accumulator can have a fluid chamber to receive the coolant at higher pressure and a gas chamber with a compressible fluid. Thus, when a pressure spike is generated from the compression of the disc stack 35, the increased pressure in the outlet passageway 55 is reduced as the accumulator absorbs the increased pressure in the coolant circuit. The accumulator can discharge the coolant back to the outlet passageway where it will be returned to tank.

As shown in FIG. 2, the first and second mechanical face seals 31, 52 prevent coolant from escaping the closed circuit defined by the inlet 54, disc stack 35 and outlet passageway 55.

INDUSTRIAL APPLICABILITY

The disclosed wheel housing 11, brake assembly 26 and accumulator 56 may be applicable to any wheel housing or wet brake assembly where longevity between maintenance procedures is desired. The disclosed accumulator 56 can provide for longevity between maintenance procedures by reducing pressure spikes experienced in the coolant circuit of a wet brake assembly 26 during a braking event. The accumulator 56 can reduce pressure spikes in a coolant circuit by increasing the available volume for coolant flow through the circuit as the accumulator 56 is compressed. By reducing such pressure spikes, the first and second mechanical face seals 31, 52 can last longer as undampened pressure spikes resulting from braking events can exceed the rating of the first and second mechanical face seals 31, 52. Specifically, it has been determined that the service life of a wheel housing 11 between maintenance procedures can be shortened when the first and second mechanical face seals 31, 52 associated with the brake assembly 26 are exposed to pressure spikes cause by braking events. Further, replacing the first and second mechanical face seals 31, 52 requires disassembly of the wheel housing 11, which is time consuming.

While only certain embodiments of been set forth, alternative embodiments and various modifications will be apparent from the above description to those skilled in the art. These and other alternatives are considered equivalents and within the spirit and scope of the present disclosure.

The invention claimed is:

1. A wheel housing comprising:
   a rotatable hub and a stationary axle housing disposed within the hub;
   a brake assembly disposed between the axle housing and the hub,
   the brake assembly including an inlet in fluid communication with an outlet passageway, wherein coolant can be moved between the inlet and the outlet passageway;
   an accumulator disposed in the outlet passageway to absorb pressure spikes of the coolant within the outlet passageway, wherein the accumulator is elongated and extends around the axle housing and between the axle housing and the brake assembly.

2. The wheel housing of claim 1 wherein the accumulator is movable between a compressed state and an expanded state.

3. The wheel housing of claim 1 wherein the accumulator is movable to the compressed state when a pressure spike occurs and to the expanded state when the pressure spike has dissipated.

4. The wheel housing of claim 1 wherein the accumulator has a pre-charge pressure, and wherein the pre charge pressure is less than a coolant pressure during a pressure spike.

5. The wheel housing of claim 1 wherein the accumulator is coupled to the axle housing.

6. The wheel housing of claim 1 wherein the accumulator accommodates air.

7. The wheel housing of claim 1 wherein the accumulator extends around the axle housing twice.

8. The wheel housing of claim 1 wherein the brake assembly further includes a park brake piston and a park brake housing, the park brake housing connected to the brake housing, at least part of the accumulator disposed between the park brake housing and axle housing.

9. The wheel housing of claim 1 wherein the accumulator is fabricated from a polymer.

10. The wheel housing of claim 9 wherein the polymer is a fluoroelastomer.

11. The wheel housing of claim 10 wherein the fluoroelastomer is reinforced with a polyamide.

12. The wheel housing of claim 7 wherein the polyamide is a nylon.

13. The wheel housing of claim 2 wherein the air inside the accumulator has a pressure ranging from about 5 to about 10 psig.

14. A method for assembling a brake housing, the method comprising:
   inserting a stationary axle housing within a rotatable hub;
   disposing a brake assembly between the axle housing and the hub;
   providing a coolant circuit in communication with the brake assembly, the coolant circuit including an outlet passageway disposed between the axle housing and the brake assembly;
   providing an accumulator in the outlet passageway, the accumulator configured to retract when a pressure of the coolant increases as a result of a braking event, wherein the accumulator is elongated and the providing of the accumulator in the outlet passageway includes wrapping the accumulator around the axle housing and between the axle housing and the brake assembly.

15. The method of claim 14 further comprising pressurizing the accumulator with air before placing the accumulator in the outlet passageway to a pressure ranging from about 5 to about 10 psig.

16. The method of claim 14 wherein the wrapping of the accumulator around the axle housing includes wrapping the accumulator around the axle housing twice.

17. A machine comprising:
   a plurality of wheel housings, each wheel housing including
      a rotatable hub and a stationary axle housing disposed within the hub;
      a brake assembly disposed between the axle housing and the hub, the brake assembly including a brake housing, the brake housing coupled to the axle housing, the brake assembly further including a disc stack, the disc stack including a plurality of friction plates coupled to the hub by a spline, the brake housing accommodating a service piston and the brake housing coupled to a reaction plate, the disc stack being sandwiched between the service piston and the reaction plate;

the brake housing including an inlet for receiving coolant, the inlet in fluid communication with the disc stack, the disc stack in fluid communication with an outlet passageway disposed between the brake assembly and the axle housing, the outlet passageway in fluid communication with the inlet;

a first duo cone seal disposed between the spline and the axle housing;

a second duo cone seal disposed between the reaction plate and at least one of the spline and the hub;

the brake housing, inlet, disc stack, first duo cone seal, second duo cone seal and axle housing forming a closed circuit for the coolant; and a compressible accumulator disposed in the outlet passageway, wherein the accumulator is elongated and extends around the axle housing and between the axle housing and the brake assembly.

18. The machine of claim 17 wherein the accumulator is elongated and hollow and is pressurized with air to a pressure ranging from about 5 to about 10 psig.

* * * * *